United States Patent
Hoshiba

(10) Patent No.: US 10,256,471 B2
(45) Date of Patent: *Apr. 9, 2019

(54) ELECTRODE WINDING ELEMENT FOR NON-AQUEOUS ELECTROLYTE RECHAREABLE BATTERY, NON-AQUEOUS ELECTROLYTE RECHARGEABLE LITHIUM BATTERY INCLUDING SAME, METHOD OF PREPARING SAME

(71) Applicant: Samsung SDI Co., Ltd., Yongin-si, Gyeonggi-do (KR)

(72) Inventor: Koji Hoshiba, Yokohama (JP)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,572

(22) Filed: Dec. 17, 2015

(65) Prior Publication Data
US 2016/0181618 A1    Jun. 23, 2016

(30) Foreign Application Priority Data

Dec. 22, 2014    (JP) .................................. 2014-258189
Aug. 20, 2015    (KR) ......................... 10-2015-0117519

(51) Int. Cl.
*H01M 4/62*    (2006.01)
*H01M 4/139*    (2010.01)
(Continued)

(52) U.S. Cl.
CPC ........... *H01M 4/623* (2013.01); *H01M 2/168* (2013.01); *H01M 2/1653* (2013.01);
(Continued)

(58) Field of Classification Search
CPC ........ H01M 4/62; H01M 10/04; H01M 4/623; H01M 4/139; H01M 10/0525;
(Continued)

(56) References Cited

U.S. PATENT DOCUMENTS

| 6,261,721 B1 * | 7/2001 | Andrieu | H01M 2/162 429/246 |
| 2006/0115730 A1 * | 6/2006 | Taniguchi | H01M 4/131 429/217 |

(Continued)

FOREIGN PATENT DOCUMENTS

| CN | 101796668 A | 8/2010 |
| CN | 102549693 A | 7/2012 |

(Continued)

OTHER PUBLICATIONS

European Search Report dated Feb. 8, 2016 in European Application No. 15201480.9.

(Continued)

*Primary Examiner* — Alexander Usyatinsky
(74) *Attorney, Agent, or Firm* — Knobbe, Martens, Olson & Bear LLP

(57) ABSTRACT

An electrode wound element for a non-aqueous electrolyte rechargeable battery includes a belt-shaped positive electrode; a belt-shaped negative electrode; a belt-shaped porous layer between the belt-shaped positive electrode and the belt-shaped negative electrode; and an adhesive layer formed on the surface of the belt-shaped porous layer, wherein the adhesive layer includes a fluorine resin-containing particulate and a binder for an adhesive layer supporting the fluorine resin-containing particulate, the binder comprising at least one of an ionic non-water-soluble binder, a non-ionic water-soluble binder, a non-ionic non-water-soluble binder and an ionic water-soluble binder.

8 Claims, 2 Drawing Sheets

(51) Int. Cl.
    *H01M 10/0525*  (2010.01)
    *H01M 10/04*    (2006.01)
    *H01M 2/16*     (2006.01)
    H01M 4/02       (2006.01)
    H01M 10/052     (2010.01)

(52) U.S. Cl.
    CPC ......... *H01M 2/1686* (2013.01); *H01M 4/139* (2013.01); *H01M 4/62* (2013.01); *H01M 4/622* (2013.01); *H01M 10/0431* (2013.01); *H01M 10/0525* (2013.01); *H01M 10/052* (2013.01); *H01M 2004/029* (2013.01)

(58) Field of Classification Search
    CPC .... H01M 4/622; H01M 2/168; H01M 2/1653; H01M 2/1686; H01M 10/0431; H01M 2004/029; H01M 10/052
    See application file for complete search history.

(56) References Cited

U.S. PATENT DOCUMENTS

| | | | |
|---|---|---|---|
| 2011/0052987 A1* | 3/2011 | Katayama | H01M 2/1646 429/221 |
| 2011/0250505 A1* | 10/2011 | Koshina | H01M 4/0404 429/338 |
| 2011/0311855 A1* | 12/2011 | Peng | H01M 2/1653 429/144 |
| 2013/0260208 A1* | 10/2013 | Cho | H01M 2/1686 429/145 |
| 2014/0363726 A1* | 12/2014 | Honda | H01M 2/1653 429/145 |

FOREIGN PATENT DOCUMENTS

| | | | |
|---|---|---|---|
| CN | 103947009 A | | 7/2014 |
| CN | 104157819 A | | 11/2014 |
| JP | 10-110052 A | | 4/1998 |
| JP | 2006-185887 A | | 7/2006 |
| JP | 2010-538173 A | | 12/2010 |
| JP | 2011-204627 A | | 10/2011 |
| JP | 2012-190784 A | | 10/2012 |
| WO | WO 2009/044741 A1 | | 2/2011 |
| WO | WO 2014-142451 A1 | | 9/2014 |
| WO | WO 2013073503 A1 | * | 4/2015 |

OTHER PUBLICATIONS

Office Action dated Mar. 28, 2017, issued in corresponding EP Application No. 15201480.9.

Office Action dated Nov. 9, 2017, issued in corresponding EP Application No. 15201480.9.

Japanese Office Action dated Sep. 11, 2018 for Japanese Patent Application No. JP 2014-258189, which cites the above-identified reference No. 1, and from which priority is claimed by subject U.S. Appl. No. 14/973,572. The Office Action also cites WO 2013/073503 A1.

First Chinese Office Action dated Nov. 27, 2018 for Chinese Patent Application No. CN 201510968894.8, which shares priority of Japanese Patent Application No. JP 2014-258189, filed Dec. 22, 2014, and Korean Patent Application No. KR 10-2015-0117519, filed Aug. 20, 2015, with subject U.S. Appl. No. 14/973,572.

* cited by examiner

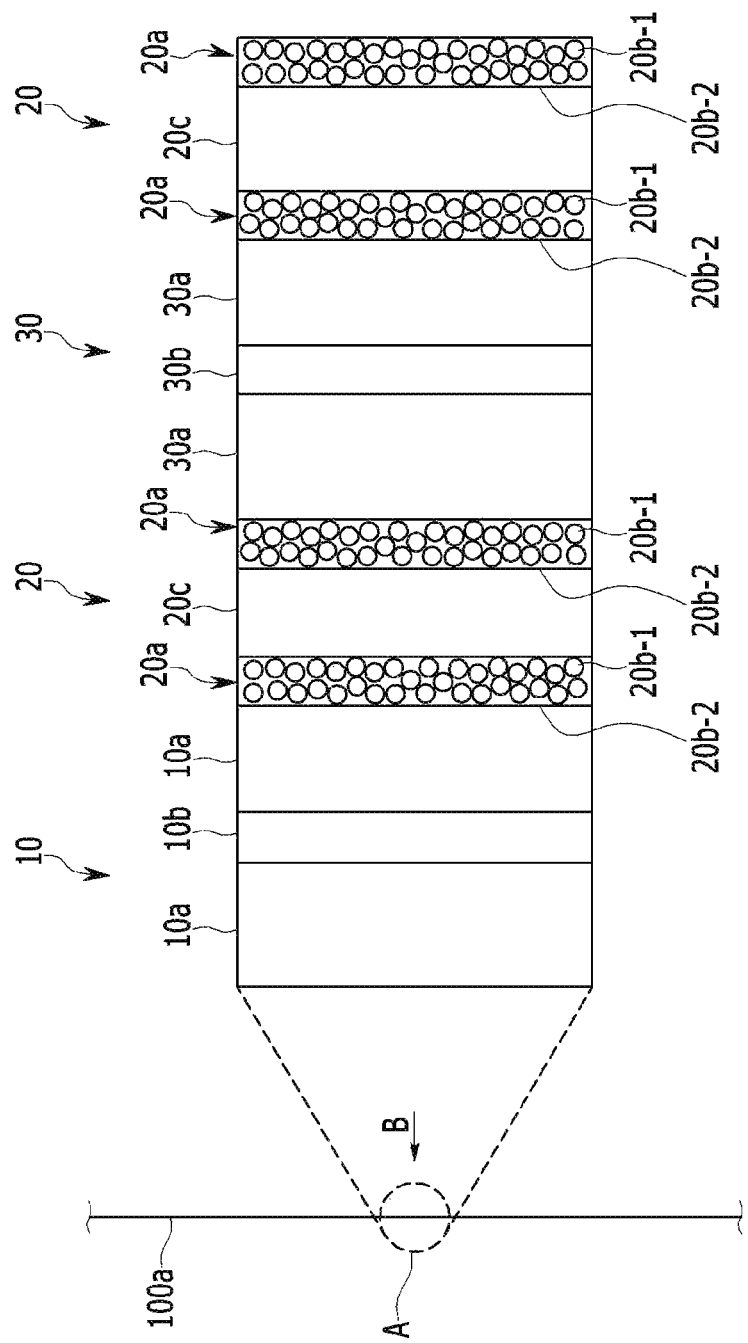

ELECTRODE WINDING ELEMENT FOR NON-AQUEOUS ELECTROLYTE RECHAREABLE BATTERY, NON-AQUEOUS ELECTROLYTE RECHARGEABLE LITHIUM BATTERY INCLUDING SAME, METHOD OF PREPARING SAME

INCORPORATION BY REFERENCE TO RELATED APPLICATIONS

Any and all priority claims identified in the Application Data Sheet, or any correction thereto, are hereby incorporated by reference under 37 CFR 1.57. This application claims priority to and the benefit of Japanese Patent Application No. 2014-258189 filed in the Japanese Patent Office on Dec. 22, 2014, and Korean Patent Application No. 10-2015-0117519 filed in the Korean Intellectual Property Office on Aug. 20, 2015. Each of the aforementioned applications is incorporated by reference herein in its entirety, and each is hereby expressly made a part of this specification.

BACKGROUND

Field

An electrode wound element for a non-aqueous electrolyte rechargeable battery, a non-aqueous electrolyte rechargeable battery including the same, and a method of preparing the electrode wound element for a non-aqueous electrolyte rechargeable battery are provided.

Description of the Related Art

Research on a polyvinylidene fluoride (PVDF)-based fluorine resin as a matrix polymer of a gel electrolyte for a rechargeable lithium ion battery has been actively made. For example, technology for forming a porous layer made of the PVDF-based fluorine resin on the surface of a separator is widely known. In this technology, the porous layer is, for example, formed on the surface of the separator in the following method.

A first method includes preparing a slurry by dissolving a fluorine resin in an organic solvent such as NMP (N-methyl pyrrolidone), dimethyl acetamide, acetone, or the like, coating the slurry on a separator or an electrode, and phase-separating the fluorine resin by using a poor solvent such as water, methanol, tripropylene glycol, or the like or vapor thereof to form a porous coating layer in which the fluorine resin is made porous.

A second method includes preparing a thermal slurry by dissolving a fluorine resin in a heating electrolytic solution using a solvent such as dimethyl carbonate, propylene carbonate, ethylene carbonate, or the like to prepare heated slurry, coating the heated slurry on a separator or an electrode to prepare a coating layer, cooling down the coating layer, and transferring the fluorine resin into a gel (a porous layer swollen by an electrolyte solution).

However, the separator having the PVDF porous layer on the surface in the above method has insufficient slipperiness when compared to a separator having no porous layer and easily becomes electrostatic and thus is difficult to handle in a preparing process. Specifically, when the separator is overlapped with belt-shaped positive and negative electrodes for a wound element, the wound element becomes deformed due to the insufficient mutual slipperiness of the separator. When the wound element is deformed, the wound element is difficult to be inserted into a case. In addition, a non-aqueous electrolyte rechargeable battery using this deformed wound element may have an insufficient cycle-life.

Furthermore, the separator having the polyvinylidene fluoride porous layer on the surface according to the aforementioned method has insufficient adherence to an electrode, and particularly, the insufficient adherence problem tends to be severe when the separator includes a heat resistance filler to improve heat resistance. When the separator has insufficient adherence to each electrode, a wound element may has a problem of easy expansion (so-called a problem of cycle expansion) as charge and discharge proceed.

In contrast, Japanese Patent Laid-Open Publication No. Hei. 10-110052, Japanese Patent Laid-Open Publication No. 2012-190784, Japanese Patent Publication No. 2010-538173, and Japanese Patent Laid-Open Publication No. 2011-204627, for example, disclose technology for using fluorine resin particles or ceramic particles. Japanese Patent Laid-Open Publication No. Hei. 10-110052 discloses a method of protruding a part of the fluorine resin particles out of a porous film separator. Japanese Patent Laid-Open Publication No. 2012-190784 discloses a method of including the ceramic particles inside a separator. Japanese Patent Laid-Open Publication No. 2010-538173 discloses a method of charging a part of micropores in a non-woven fabric with the fluorine resin particles. Japanese Patent Laid-Open Publication No. 2011-204627 discloses a method of preparing a negative electrode by using aqueous slurry in which a polymer complex of a fluorine resin and a polymer having an oxygen-containing functional group is dispersed. However, these methods do not solve the aforementioned problem at all.

SUMMARY OF CERTAIN INVENTIVE ASPECTS

One embodiment provides an electrode wound element for a non-aqueous electrolyte rechargeable battery capable of improving handling property of a separator during the preparation, being suppressed from deformation, and improving adherence of the separator to each electrode.

Another embodiment provides a non-aqueous electrolyte rechargeable battery including the electrode wound element.

Yet another embodiment provides a method of preparing an electrode wound element for a non-aqueous electrolyte rechargeable battery.

According to one embodiment, an electrode wound element for a non-aqueous electrolyte rechargeable battery includes a belt-shaped positive electrode; a belt-shaped negative electrode; a belt-shaped porous layer between the belt-shaped positive electrode and the belt-shaped negative electrode; and an adhesive layer formed on the surface of the belt-shaped porous layer, wherein the adhesive layer includes a fluorine resin-containing particulate and a binder for an adhesive layer supporting the fluorine resin-containing particulate and having a total volume which is less than that of the fluorine resin-containing particulate, the binder for an adhesive layer includes at least one selected from an ionic non-water-soluble binder, a non-ionic water-soluble binder, a non-ionic non-water-soluble binder and an ionic water-soluble binder, provided that when the binder for the adhesive layer includes an ionic water-soluble binder, the binder for an adhesive layer further includes at least one selected from the ionic non-water-soluble binder, the non-ionic water-soluble binder and the non-ionic non-water-soluble binder, and a content of the ionic water-soluble binder is about 2 wt % or less based on the weight of the fluorine resin-containing particulate.

In one embodiment, the binder for the adhesive layer may include at least one selected from an ionic non-water-soluble binder and a non-ionic water-soluble binder.

In one embodiment, the ionic non-water-soluble binder may include at least one selected from a carboxylic acid-modified acrylic acid ester, a polyolefin ionomer, and a carboxylic acid-modified styrene-butadiene copolymer.

In one embodiment, the non-ionic water-soluble binder may include at least one selected from poly-N-vinyl acetamide (PNVA), polyvinyl alcohol (PVA), hydroxyethyl cellulose (HEC), methyl cellulose, polyvinylpyrrolidone (PVP), and polyoxyethylene.

In one embodiment, the belt-shaped negative electrode may include a negative active material layer including a negative active material and a fluorine resin-containing particulate, and the adhesive layer may be attached to the negative active material layer.

In one embodiment, the fluorine resin-containing particulate may be a spherical shape particle.

In one embodiment, the fluorine resin may include polyvinylidene fluoride.

According to one embodiment, a non-aqueous electrolyte rechargeable battery including the electrode wound element for a non-aqueous electrolyte rechargeable battery is provided.

According to one embodiment, a method of preparing an electrode wound element for a non-aqueous electrolyte rechargeable battery includes: coating and drying aqueous slurry including a fluorine resin-containing particulate; and a binder for an adhesive layer supporting the fluorine resin-containing particulate and having a total volume which is less than that of the fluorine resin-containing particulate on the surface of a belt-shaped porous layer, wherein the binder for an adhesive layer includes at least one selected from an ionic non-water-soluble binder, a non-ionic water-soluble binder, a non-ionic non-water-soluble binder and an ionic water-soluble binder or the binder for an adhesive layer includes an ionic water-soluble binder and at least one selected from an ionic non-water-soluble binder, a non-ionic water-soluble binder and a non-ionic non-water-soluble binder, and a content of the ionic water-soluble binder is about 2 wt % or less based on the weight of the fluorine resin-containing particulate.

According to one embodiment, the wound element may improve handling properties of a separator and be suppressed from deformation. The adherence of the adhesive layer of the separator to each electrode may be improved, and also, the cycle expansion of the wound element may be improved.

BRIEF DESCRIPTION OF THE DRAWINGS

FIG. 2 is a cross-sectional view showing the schematic structure of an electrode stack structure according to one embodiment.

DETAILED DESCRIPTION OF CERTAIN INVENTIVE EMBODIMENTS

Figure 1:
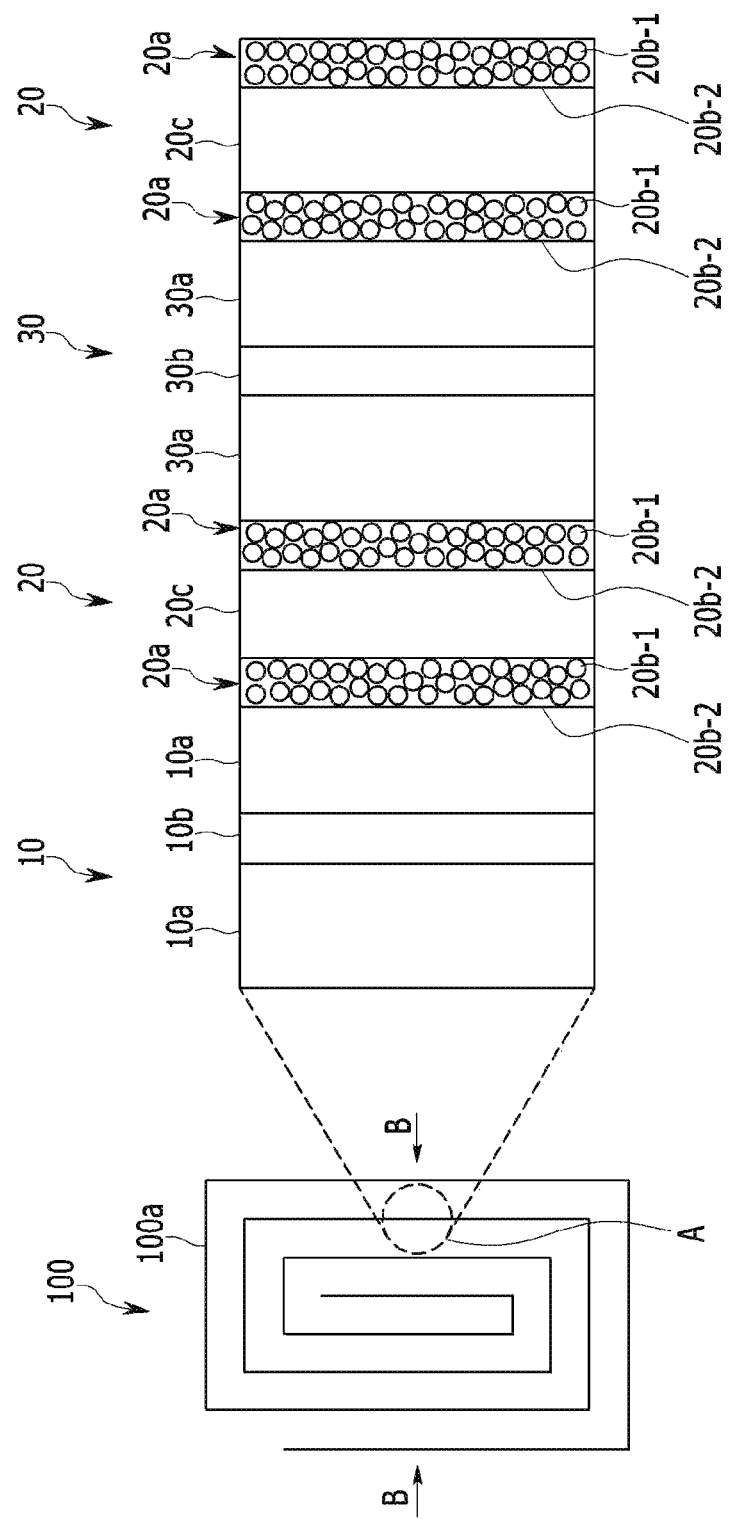
FIG. 1 is a cross-sectional view showing the schematic structure of a rechargeable lithium ion battery according to one embodiment.

Hereinafter, the present invention is described in detail.

According to one embodiment, an electrode wound element for a non-aqueous electrolyte rechargeable battery includes a belt-shaped positive electrode; a belt-shaped negative electrode; a belt-shaped porous layer between the belt-shaped positive electrode and the belt-shaped negative electrode; and an adhesive layer formed on the surface of the belt-shaped porous layer, wherein the adhesive layer includes a fluorine resin-containing particulate and a binder for an adhesive layer supporting the fluorine resin-containing particulate and having a total volume which is that of the fluorine resin-containing particulate, the binder for an adhesive layer includes at least one selected from an ionic non-water-soluble binder, a non-ionic water-soluble binder, a non-ionic non-water-soluble binder and an ionic water-soluble binder, provided that when the binder for the adhesive layer includes an ionic water-soluble binder, the binder for an adhesive layer further includes at least one selected from the ionic non-water-soluble binder, the non-ionic water-soluble binder and the non-ionic non-water-soluble binder, and a content of the ionic water-soluble binder is about 2 wt % or less based on the weight of the fluorine resin-containing particulate.

The adhesive layer includes the fluorine resin-containing particulate and the binder for an adhesive layer supporting the fluorine resin-containing particulate and having a total volume which is less than that of the fluorine resin-containing particulate, and thus may improve handling property of the separator. In addition, the wound element may be suppressed from deformation.

Furthermore, the binder for an adhesive layer is included in the above structure and adherence of the adhesive layer to each electrode may be improved and as a result, cycle expansion is improved.

The binder for the adhesive layer may include at least one selected from an ionic non-water-soluble binder and a non-ionic water-soluble binder. In connection therewith, the adherence of the adhesive layer to each electrode is improved, and as a result, the cycle expansion of the wound element may be improved.

The ionic non-water-soluble binder may include at least one selected from a carboxylic acid-modified acrylic acid ester, a polyolefin ionomer, and a carboxylic acid-modified styrene-butadiene copolymer. In connection therewith, the adherence of the adhesive layer to each electrode is improved, and as a result, the cycle expansion of the wound element may be improved.

The non-ionic water-soluble binder may include at least one selected from poly-N-vinyl acetamide (PNVA), polyvinyl alcohol (PVA), hydroxyethyl cellulose (HEC), methyl cellulose, polyvinylpyrrolidone (PVP), and polyoxyethylene. In connection therewith, the adherence of the adhesive layer to each electrode is improved, and as a result, the cycle expansion of the wound element may be improved.

The belt-shaped negative electrode includes a negative active material layer including a negative active material and a fluorine resin-containing particulate, and the adhesive layer may be adhered to the negative active material layer. The deformation of the wound element may be further improved, and in addition, the adherence of the adhesive layer to each electrode is improved, and as a result, the cycle expansion of the wound element may be improved.

The fluorine resin-containing particulate may have a spherically shaped particle. In connection therewith, the handling property of the separator and the deformation of the wound element may be further improved. In addition, the adherence of the adhesive layer to each electrode is improved, and as a result, the cycle expansion the wound element may be improved.

The fluorine resin may include polyvinylidene fluoride. Herein, the handling property of the separator and the deformation of the wound element may be further improved.

In addition, the adherence of the adhesive layer to each electrode is improved, and as a result, the cycle expansion of the wound element may be improved.

Another embodiment provides a non-aqueous electrolyte rechargeable battery including the electrode wound element for a non-aqueous electrolyte rechargeable battery.

Yet another embodiment provides a method of preparing an electrode wound element for a non-aqueous electrolyte rechargeable battery includes coating and drying aqueous slurry including a fluorine resin-containing particulate; and a binder for an adhesive layer supporting the fluorine resin-containing particulate and having a total volume which is less than that of the fluorine resin-containing particulate on the surface of a belt-shaped porous layer, wherein the binder for an adhesive layer includes at least one selected from an ionic non-water-soluble binder, a non-ionic water-soluble binder, a non-ionic non-water-soluble binder and an ionic water-soluble binder or the binder for an adhesive layer includes an ionic water-soluble binder and at least one selected from an ionic non-water-soluble binder, a non-ionic water-soluble binder and a non-ionic non-water-soluble binder, and a content of the ionic water-soluble binder is about 2 wt % or less based on the weight of the fluorine resin-containing particulate.

The preparing method may improve the handling properties of the separator and the deformation of the wound element.

Hereinafter, referring to the drawings, one exemplary embodiment is illustrated in detail. On the other hand, constituent elements substantially having the same functional structure in the present specification and drawing are assigned by the same numeral and will not be repetitively illustrated.

1. Structure of Rechargeable Lithium Ion Battery

Entire Structure of Rechargeable Lithium Ion Battery

First, referring to FIGS. 1 and 2, a rechargeable lithium ion battery according to one embodiment is illustrated. FIG. 1 provides a plane view showing a wound element 100 and an enlarged view regarding the region A of the wound element 100. FIG. 2 provides a plane view showing an electrode stack structure 100*a* in which a positive electrode, a negative electrode, and two sheets of separator are stacked and an enlarged view showing the region A of the electrode stack structure 100*a*.

The rechargeable lithium ion battery includes a wound element 100, a non-aqueous electrolyte solution, and an exterior material. The wound element 100 is obtained by winding the electrode stack structure 100*a* obtained by sequentially stacking a belt-shaped negative electrode 10, a belt-shaped separator 20, a belt-shaped positive electrode 30, and a belt-shaped separator 20 in a length direction and compressing the wound electrode stack structure 100*a* in an arrow direction B.

Structure of Negative Electrode

The belt-shaped negative electrode 10 includes a negative current collector 10*b* and negative active material layers 10*a* formed on the negative current collector 10*b*.

The belt-shaped negative electrode 10 may be an aqueous negative electrode. That is, the wound element 100 and the rechargeable lithium ion battery according to the present embodiment may include an aqueous negative electrode.

Specifically, the negative active material layer 10*a* includes a negative active material, a thickener, and a binder.

The negative active material layer 10*a* may include a negative active material, a thickener and a binder. The negative active material of the negative active material layer 10*a* may include is not particularly limited as long as it may be alloyed with lithium or reversibly intercalated and deintercalated with lithium. For example, the negative active material may include a metal such as lithium, indium (In), tin (Sn), aluminum (Al), silicon (Si) or the like, alloys or oxides thereof; transition metal oxide such as $Li_{4/3}Ti_{5/3}O_4$, SnO, or the like; a carbon material such as artificial graphite, natural graphite, a mixture of artificial graphite and natural graphite, natural graphite coated with artificial graphite, a hard carbon, graphite carbon fiber, resin-fired carbon, thermal decomposition vapor grown carbon, coke, mesocarbon microbeads (MCMB), a furfuryl alcohol resin-fired carbon, polyacene, a pitch-based carbon fiber, or the like; or the like.

These may be used singularly or in a mixture of two or more. Among them, graphite-based materials such as artificial graphite, natural graphite, a mixture of artificial graphite and natural graphite, natural graphite coated with artificial graphite, hard carbon, a graphite carbon fiber may be used as a main material.

The thickener may adjust a viscosity of negative active material layer slurry to be suitably coated and simultaneously may act as a binder in the negative active material layer 10*a*. The thickener may be a water-soluble polymer, for example a cellulose-based polymer, a polyacrylic acid-based polymer, polyvinyl alcohol, polyethylene oxide, or the like. The cellulose-based polymer may be, for example a metal salt of carboxymethyl cellulose (CMC), an alkali metal salt or an ammonium salt, a cellulose derivative such as methyl cellulose, ethyl cellulose, hydroxy alkyl cellulose, or the like.

The thickener may be polyvinylpyrrolidone; starch; phosphoric acid starch; casein; each kind of modified starch; chitin; a chitosan derivative, or the like. These may be used singularly or in a mixture of two or more. Among them, the cellulose-based polymer may be used, and for example, and an alkali metal salt of carboxymethyl cellulose may be used.

The binder attaches negative active materials to each other. The binder may be any binder for an aqueous negative electrode without particular limitation. Examples of the binder may be a particulate of an elastomer-based polymer. The elastomer-based polymer may be SBR (styrene butadiene rubber), BR (butadiene rubber), NBR (nitrilebutadiene rubber), NR (natural rubber), IR (isoprene rubber), EPDM (ethylene-propylene-diene terpolymer), CR (chloroprene rubber), CSM (chloro sulfonated polyethylene), acrylic acid ester, a copolymer of methacrylic acid ester, and a partly or wholly hydrogenated polymer thereof, an acrylic acid ester-based copolymer, or the like. In addition, in order to improve the binding properties, it may be modified with a monomer having a polar functional group such as a carboxylic acid group, a sulfonic acid group, a phosphoric acid group, a hydroxy group, or the like. Furthermore, the negative active material layer 10*a* may include a post-described fluorine resin-containing particulate as a binder. The fluorine resin-containing particulate is added to slurry in a powder form and dispersed therein or in an aqueous dispersion form.

The slurry for forming the negative active material layer 10*a* may use water as a solvent.

The amount ratio of a thickener and a binder in the negative active material layer is not particularly limited but may be any ratio applicable to a negative active material layer for a rechargeable lithium ion battery.

The negative current collector 10*b* may include any materials as long as being a conductor, and examples thereof may include copper, stainless steel, nickel plating steel, or the like. A negative terminal may be connected to the negative current collector 10*b*.

The belt-shaped negative electrode 10 may be, for example, prepared in the following method. In other words, negative active material layer slurry (aqueous slurry) is prepared by dispersing a negative active material layer material into water and then, coated on a current collector to form a coating layer.

Subsequently, the coating layer is dried. Herein, a fluorine resin particulate and an elastomer-based polymer particulate in the negative active material layer slurry are dispersed in the negative active material layer 10a. Subsequently, the dried coating layer is compressed with the negative current collector 10b, preparing the belt-shaped negative electrode 10.

A belt-shaped porous layer 20c is not particularly limited but may be any separator used for a rechargeable lithium ion battery.

As for the belt-shaped porous layer 20c, a porous layer or a non-woven fabric showing excellent high rate discharge performance or the like may be used alone or as a combination. The belt-shaped porous layer 20c may include a resin, for example a polyolefin-based resin such as polyethylene and polypropylene, a polyester-based resin such as polyethylene terephthalate, polybutylene terephthalate, polyvinylidene fluoride, a vinylidene fluoride (VDF)-hexafluoro propylene (HFP) copolymer, a vinylidene fluoride-perfluoro vinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, or the like.

An adhesive layer 20a includes the aforementioned fluorine resin-containing particulate 20b-1 and the binder 20b-2 for an adhesive layer and binds the belt-shaped separator 20 with the belt-shaped negative electrode 10 and the belt-shaped positive electrode 30. In FIG. 1, the adhesive layer 20a is formed on both sides of the belt-shaped separator 20 but may be formed on at least one surface thereof.

The fluorine resin-containing particulate 20b-1 includes a fluorine resin. Example of the fluorine resin including the fluorine resin-containing particulate 20b-1 may include, polyvinylidene fluoride, a copolymer including polyvinylidene fluoride, or the like. The copolymer including the polyvinylidene fluoride may be a copolymer of vinylidene fluoride (VDF) and hexafluoro propylene (HFP), a copolymer of vinylidene fluoride (VDF) and tetrafluoroethylene (TFE), or the like. As for the fluorine resin, the copolymer modified with a polar group such as carboxylic acid or the like may be used.

The particle diameter of the fluorine resin-containing particulate 20b-1 (when the fluorine resin-containing particulate 20b-1 is referred to as a spherical shape) has no particular limit but may be any size dispersible in the negative active material layer 10a. For example, the fluorine resin-containing particulate 20b-1 may have an average particle diameter (an arithmetic average of particle diameters) in a range of about 80 nm to about 500 nm. The average particle diameter of the fluorine resin-containing particulate 20b-1 may be for example measured in a laser diffractometry method. Specifically, the laser diffractometry method is used to measure the particle distribution of the fluorine resin-containing particulate 20b-1, and this particle distribution is used to calculate the arithmetic average of particle diameters.

On the other hand, the fluorine resin-containing particulate 20b-1 may be variously processed, for example, combined with another resin, unless an effect according to one exemplary embodiment is deteriorated. For example, the fluorine resin-containing particulate 20b-1 may be combined with an acrylic resin. The fluorine resin-containing particulate 20b-1 may have an IPN (inter-penetrating network polymer) structure.

The fluorine resin-containing particulate 20b-1 may be for example prepared by emulsion-polymerizing a monomer including a fluorine resin (for example, vinylidene fluoride). In addition, the fluorine resin-containing particulate 20b-1 may be prepared by suspension-polymerizing a monomer including a fluorine resin and grinding a coarse particle obtained therefrom.

The fluorine resin-containing particulate 20b-1 may appropriately be a spherical shape particle. The spherically-shaped fluorine resin-containing particulate 20b-1 may be for example prepared in the emulsion polymerization method. In addition, the fluorine resin-containing particulate 20b-1 may be for example examined with SEM (a scanning electron microscope).

A binder 20b-2 for the adhesive layer 20a may support the fluorine resin-containing particulate 20b-1 in the adhesive layer 20a. The total volume of the binder 20b-2 in the adhesive layer 20a is smaller than the total volume of the fluorine resin-containing particulate 20b-1 in the adhesive layer 20a. Specifically, the total volume of the fluorine resin-containing particulate 20b-1/the total volume of the binder 20b-2 for the adhesive layer may be in a range of 2 to 20.

When the adhesive layer 20a includes the fluorine resin-containing particulate 20b-1 and the binder 20b-2 for an adhesive layer in the above volume ratio, the handling property of the belt-shaped separator 20 during the preparation may be improved. Specifically, the slipperiness of the belt-shaped separator 20 is improved, and the deformation of the wound element 100 may be suppressed. As a result, cycle-life of a battery may be improved.

The binder 20b-2 for the adhesive layer may include at least one selected from an ionic non-water-soluble binder, a non-ionic water-soluble binder, and a non-ionic non-water-soluble binder. According to another embodiment, the binder 20b-2 for the adhesive layer may include at least one selected from an ionic non-water-soluble binder and a non-ionic water-soluble binder.

In one embodiment, the binder 20b-2 for the adhesive layer may further include an ionic water-soluble binder. Herein, the content of the ionic water-soluble binder may be less than or equal to about 2 wt % (based on the mass of fluorine resin-containing particulate). Specifically, the ionic water-soluble binder may be included in an amount of less than or equal to about 1.0 wt %.

When the ionic water-soluble binder is included in an amount of greater than about 2 wt %, the adherence of the adhesive layer 20a may be deteriorated. The adherence of the adhesive layer 20a may be realized, as the polar groups that the fluorine resin-containing particulate 20b-1, the ionic non-water-soluble binder, or the like included in the adhesive layer 20a have are oriented in a particular direction on the interface with an electrode (particularly, a negative electrode), and when the content of the ionic water-soluble binder is larger than about 2 wt %, the ionic water-soluble binder uniformly distributed in coating and drying processes may have negative influence on the orientation of the polar groups on the surface of the electrode and as a result, deteriorate the adherence of the adhesive layer 20a.

In one embodiment, when the binder 20b-2 for the adhesive layer includes a non-ionic water-soluble binder, at least one selected from an ionic non-water-soluble binder, and a non-ionic non-water-soluble binder, the content of the non-ionic water-soluble binder (based on the total weight of the binder 20b-2 for an adhesive layer) may be less than or equal to about 50 wt %. When the non-ionic water-soluble binder is included in an amount of less than or equal to about 50 wt %, a separator having satisfactory ion permeability may be obtained without deteriorating porosity of a porous layer during formation of an adhesive layer accompanied with drying and coating.

The ionic non-water-soluble binder is not particularly limited. Examples of the ionic non-water-soluble binder may be carboxylic acid-modified acrylic acid ester, a polyolefin ionomer and a carboxylic acid-modified styrene-butadiene copolymer. The ionic non-water-soluble binder may be by itself or in a mixture thereof.

The non-ionic water-soluble binder is not particularly limited. Examples of the non-ionic water-soluble binder may be poly-N-vinyl acetamide (PNVA), polyvinyl alcohol (PVA), polyvinylpyrrolidone (PVP), hydroxyethyl cellulose, methyl cellulose, hydroxypropyl cellulose, hydroxypropyl guar gum, locust bean gum, and polyoxyethylene. The non-ionic water-soluble binder may be by itself or in a mixture thereof.

The non-ionic non-water-soluble binder is not particularly limited. Examples of the non-ionic non-water-soluble binder may be a polybutyl acrylate aqueous dispersed material or the like obtained by emulsion-polymerizing a radical polymerizable monomer such as butyl acrylate or the like, an anion-based surfactant such as sodium lauryl sulfate or the like, and a water-soluble initiator such as potassium persulfate. The non-ionic non-water-soluble binder may be obtained by appropriately copolymerizing a monomer including a hydroxy group such as acrylic acid-2-hydroxyethyl to improve dispersion stability in water. In addition, the non-ionic non-water-soluble binder may be non-modified poly methylmethacrylate. The non-ionic non-water-soluble binder may be one or more than two selected among these materials.

The ionic water-soluble binder is not particularly limited. Examples of the ionic water-soluble binder may be poly acrylic acid, carboxymethyl cellulose (CMC), a styrene-maleic acid copolymer, an isobutylene-maleic acid copolymer, an N-vinyl acrylamide-acrylic acid copolymer, an alkali metal salt thereof, an ammonium salt thereof, or the like. The ionic water-soluble binder may be one or more than two selected among these materials.

According to one embodiment, the binder for the adhesive layer has the above structure and thus may improve the adherence of the adhesive layer 20a to each electrode, particularly, the negative electrode 10. In addition, cycle expansion may be suppressed.

The adhesive layer 20a may also include a thickener to apply appropriate viscosity during coating. In addition, the adhesive layer 20a may further include a heat resistance filler particle to adjust porosity and obtain thermal stability.

The heat resistance filler particle has no particular limit but may, for example, include a heat resistance organic filler particle, a heat resistance inorganic filler particle, or a mixture thereof. When the heat resistance organic filler particle and the heat resistance inorganic filler particle are mixed, there is no particular limit to their mixing ratio.

In one embodiment, the heat resistance filler physically suppresses thermal contraction of a porous layer and has insufficient mobility in the adhesive layer. Accordingly, when the heat resistance filler particle is included in the porous layer, the porous layer almost does not move, even though a wound element is pushed down under a lower pressure than when an electrode is compressed, and accordingly, a sufficient adhesive interface on the porous layer is not formed, and the porous layer is not sufficiently adhered to each electrode. In other words, the separator has insufficient adherence to each electrode.

The heat resistance organic filler particle has a shape close to a sphere and simultaneously a satisfactory surface slipperiness and thus may be easily dispersed in the adhesive layer 20a when the wound element 100 is pushed down, and accordingly, an adhesive interface between the adhesive layer 20a and each electrode 10 and 20 may be easily enlarged even under a low pressure when the wound element 100 is pushed down. Accordingly, the heat resistance filler particle included in the adhesive layer 20a may be preferably the heat resistance organic filler.

The heat resistance organic filler particle may be, for example, cross-linked polystyrene (cross-linked PS), cross-linked poly methylmethacrylate (cross-linked PMMA), a silicone resin, cured epoxy, polyether sulfone, polyamideimide, polyimide, a melamine resin, a polyphenylenesulfide resin particulate, or the like. The heat resistance organic filler particle may be one or more than two selected from these materials.

The heat resistance inorganic filler particle may be specifically a ceramic particle and more specifically a metal oxide particle. The metal oxide particle may be, for example, particulates of alumina, boehmite, titania, zirconia, magnesia, zincoxide, hydroxide aluminum, magnesium hydroxide, or the like.

The average particle diameter of the heat resistance filler particle may be less than or equal to ⅔ of the thickness of the adhesive layer 20a. The average particle diameter of the heat resistance filler particle indicates an accumulated volume of 50% (D50) measured in a laser diffraction method. The content of the heat resistance filler particle has no particular limit, as far as an effect according to an exemplary embodiment is obtained but may be less than or equal to about 80 wt % based on the total weight of the adhesive layer 20a.

The adhesive layer 20a may be prepared in the following method.

A material for the adhesive layer 20a is dissolved in and dispersed in water to prepare adhesive layer mix slurry (aqueous slurry). Subsequently, this adhesive layer mix slurry is coated on at least one surface of the belt-shaped porous layer 20c out of both sides to form a coating layer. Then, this coating layer is dried. Through this process, the adhesive layer 20a is formed.

The belt-shaped positive electrode 30 may include a positive electrode current collector 30b and a positive active material layer 30a formed on both surfaces of the positive electrode current collector 30b. The positive active material layer 30a may include at least a positive active material and further a conductive agent and a binder.

The positive active material may include any material reversibly intercalating and deintercalating lithium ions without any particular limit but, for example, lithium cobalt oxide (LCO), lithium nickel oxide, lithium nickel cobalt oxide, lithium nickel cobalt aluminum oxide (hereinafter, referred to be "NCA"), lithium nickel cobalt manganese oxide (hereinafter, referred to be "NCM"), lithium manganese oxide, lithium iron phosphate, nickel sulfate, copper sulfate, sulfur, iron oxide, vanadium oxide, or the like. These positive active materials may be used alone or as a mixture of more than two. The NCA and NCM correspond to a lithium salt of transition metal oxide having a layered rock salt structure.

Particularly, the positive active material may be a lithium salt of transition metal oxide having a layered rock salt structure among the above materials. The NCA or NCM, the lithium salt of transition metal oxide having a layered rock salt structure may be, for example, a lithium salt of ternary transition metal oxide represented by $Li_{1-x-y-z}Ni_xCo_yAl_zO_2$ (NCA) or $Li_{1-x-y-z}Ni_xCo_yMn_zO_2$ (NCM) (wherein, $0<x<1$, $0<y<1$, $0<z<1$, simultaneously $x+y+z<1$).

The conductive agent may be, for example, carbon black such as ketjen black, acetylene black, or the like, natural graphite, artificial graphite, or the like but has no particular limit if conductivity of a positive electrode is increased.

The binder bonds the positive active material itself and also, the positive active material with the positive electrode current collector 30b. The binder has no particular limit in its kind but includes any binder used in a conventional positive active material layer for a rechargeable lithium ion battery. For example, the binder may be polyvinylidene fluoride, a vinylidene fluoride (VDF)-hexafluoro propylene (HFP) copolymer, a vinylidene fluoride-perfluoro vinylether copolymer, a vinylidene fluoride-tetrafluoroethylene copolymer, a vinylidene fluoride-trifluoroethylene copolymer, an ethylenepropylene diene terpolymer, a styrene butadiene rubber, an acrylonitrile butadiene rubber, fluororubber, polyvinyl acetate, polymethyl methacrylate, polyethylene, cellulose nitrate, but the binder may not be particularly limited if it binds the positive active material and the conductive agent on the current collector 21.

The positive electrode current collector 30b may include any conductor, for example, aluminum, stainless steel, nickel plating steel or the like. The positive electrode current collector 30b may be connected with a positive terminal.

The belt-shaped positive electrode 30 may be prepared, for example, in the following method.

A positive active material layer material is dispersed in an organic solvent or water to prepare positive active material layer slurry, and then, the positive active material layer slurry is coated on a current collector to form a coating layer. Subsequently, the coating layer is dried and compressed with a positive electrode current collector 30b, preparing the belt-shaped positive electrode 30. The organic solvent may be N-methylpyrrolidone but is not limited thereto.

The electrode stack structure 100a is prepared by sequentially stacking the belt-shaped negative electrode 10, the belt-shaped separator 20, the belt-shaped positive electrode 30, and the belt-shaped separator 20. Accordingly, since the belt-shaped separator 20 is disposed on one surface of the electrode stack structure 100a, and the belt-shaped negative electrode 10 is disposed on the other surface thereof, the one surface of the electrode stack structure 100a (i.e., the belt-shaped separator 20) contacts the other surface of the electrode stack structure 100a (i.e., the belt-shaped negative electrode 10) when the electrode stack structure 100a is wound.

The non-aqueous electrolyte is obtained by dissolving an electrolytic salt in an organic solvent. The electrolytic salt is not particularly limited, for example, a lithium salt. The lithium salt may be, for example, an inorganic ion salt including lithium (Li), sodium (Na) or potassium (K) such as $LiClO_4$, $LiBF_4$, $LiAsF_6$, $LiPF_6$, $LiPF_{6-x}(C_nF_{2n+1})_x$ ($1<x<6$, $n=1$ or $2$), LiSCN, LiBr, LiI, $Li_2SO_4$, $Li_2B_{10}Cl_{10}$, $NaClO_4$, NaI, NaSCN, NaBr, $KClO_4$, KSCN or the like, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfate, lithium octyl sulfate, lithium dodecylbenzene sulphonate. These may be used by themselves or in a mixture of two or more.

The concentration of the electrolytic salt may be the same as that of a non-aqueous electrolyte used in a conventional rechargeable lithium battery, and is not particularly limited. In one embodiment, an electrolyte solution including an appropriate lithium compound (electrolytic salt) at a concentration of about 0.8 to about 1.5 mol/L may be used.

The organic solvent may be, for example, cyclic carbonate esters such as propylene carbonate, ethylene carbonate, butylene carbonate, chloroethylene carbonate, vinylene carbonate, or the like; cyclic esters such as γ-butyrolactone, γ-valero lactone or the like; linear carbonates such as dimethyl carbonate, diethylcarbonate, ethylmethyl carbonate, or the like; linear esters such as methyl formate, methyl acetate, methyl butyrate, or the like; tetrahydrofuran or a derivative thereof; ethers such as 1,3-dioxane, 1,4-dioxane, 1,2-dimethoxy ethane, 1,4-dibutoxyethane, methyl diglyme or the like; nitriles such as acetonitrile, benzonitrile, or the like; dioxolane or a derivative thereof; ethylene sulfide, sulfolane, sultone or a derivative thereof which may be used by itself or as a mixture of two or more, without limitation.

A non-aqueous electrolyte solution is impregnated into the belt-shaped separator 20. On the other hand, each electrode may appropriately include a known auxiliary conductive agent, an additive, or the like. The exterior material may be, for example, aluminum laminate.

2. Method of Preparing Non-Aqueous Electrolyte Rechargeable Lithium Ion Battery

A method of preparing a Non-aqueous electrolyte rechargeable lithium ion battery is illustrated.

Method of Preparing a Belt-Shaped Positive Electrode

The belt-shaped positive electrode 30 may be, for example, prepared in the following method.

A positive active material layer material is dispersed in an organic solvent or water to prepare positive active material layer slurry, and the positive active material layer slurry is coated on a current collector to form a coating layer.

Subsequently, the coating layer is dried and then, compressed with a positive electrode current collector 30b, preparing the belt-shaped positive electrode 30.

Method of Preparing a Belt-Shaped Negative Electrode

The belt-shaped negative electrode 10 may be, for example, prepared in the following method.

A negative active material layer material is dispersed in water to prepare negative active material layer slurry, and this negative active material layer slurry is coated on a current collector to form a coating layer. Subsequently, the coating layer is dried. The fluorine resin particulate and the elastomer-based polymer particulate in the negative active material layer slurry are dispersed in a negative active material layer 10a. Subsequently, the dried coating layer is compressed with a negative current collector 10b, preparing the belt-shaped negative electrode 10.

Method of Preparing a Belt-Shaped Separator

The belt-shaped separator 20 may be prepared in the following method.

A material for an adhesive layer 20a is dispersed in and dissolved in water, preparing adhesive layer mix slurry. Subsequently, this adhesive layer mix slurry is coated on at least one surface of a belt-shaped porous layer 20c to form a coating layer. Then, this coating layer is dried, forming the adhesive layer 20a. In other words, the belt-shaped separator 20 is obtained.

Method of Preparing Wound Element and Battery

The belt-shaped negative electrode 10, the belt-shaped separator 20, the belt-shaped positive electrode 30, and the belt-shaped separator 20 are sequentially stacked, preparing the electrode stack structure 100a. Subsequently, the electrode stack structure 100a is wound. Accordingly, one surface of the electrode stack structure 100a (i.e., the belt-shaped separator 20) contacts the other surface of the electrode stack structure 100a (i.e., the belt-shaped negative electrode 10). Through this process, the wound element 100 is prepared.

Subsequently, the wound element 100 is pushed down to make it flat. The flat wound element 100 is inserted into an exterior material (for example, a laminate film) with a non-aqueous electrolyte, and the exterior material is sealed, preparing a rechargeable lithium ion battery. In one embodiment, when the exterior material is sealed, a terminal end connected to each current collector is protruded out of the exterior material.

Hereinafter, examples and comparative examples of the present invention are described. These examples, however, are not in any sense to be interpreted as limiting the scope of the invention.

Example 1

Preparation of Positive Electrode

Lithium cobalt oxide, carbon black, and polyvinylidene fluoride (PVDF) in a solid weight ratio of 96:2:2 were dissolved in and dispersed in N-methyl pyrrolidone, preparing positive active material layer slurry.

The positive active material layer slurry was coated on both sides of a 12 μm-thick aluminum foil as a current collector, dried, and compressed, forming a positive active material layer. The current collector and the positive active material layer had a total thickness of 120 μm. Subsequently, an aluminum lead wire was welded at the terminal end of the electrode, obtaining a belt-shaped positive electrode.

Preparation of Negative Electrode

On the other hand, negative active material layer slurry was prepared by dissolving and dispersing graphite, a modified SBR particulate aqueous dispersed material, a fluorine resin-containing particulate aqueous dispersed material complicated by polymerizing an acrylic resin in polyvinylidene fluoride aqueous dispersed material, and a sodium salt of carboxylmethyl cellulose in a solid weight ratio of 97:1:1:1 in and into water as a solvent. Subsequently, this negative active material layer slurry was coated on both sides of a 10 μm-thick copper foil as a current collector and dried.

The dried negative active material layer slurry coating layer was compressed, forming a negative active material layer. The current collector and the negative active material layer had a total thickness of 120 μm. Then, a nickel lead wire was welded at the terminal end, preparing a belt-shaped negative electrode.

The fluorine resin-containing particulate had an average particle diameter of about 300 nm when measured in a laser diffraction method. In addition, when the fluorine resin-containing particulate was examined with SEM, it turned out to be a spherical shape particle.

Preparation of Separator

The fluorine resin-containing particulate aqueous dispersed material, poly-N-vinyl acetamide (PNVA), carboxylic acid-modified polybutyl acrylate aqueous dispersed material, a cross-linked polystyrene (PS) particle, and an alumina particle having an average particle diameter of 0.5 μm were dissolved in and dispersed in water as a solvent, preparing adhesive layer mix slurry.

Herein, the poly-N-vinyl acetamide and the carboxylic acid-modified polybutyl acrylate as a binder for an adhesive layer were mixed in a ratio (a mass ratio) of 10:50. In addition, the cross-linked polystyrene particle and the alumina particle as a heat resistance filler were used in a volume ratio of 80:20. The fluorine resin-containing particulate, the binder for an adhesive layer, and the heat resistance filler were used in a volume ratio of 44:6:50. On the other hand, the alumina particle had an average particle diameter of 0.5 μm in Example 1 and each post-described Example and Comparative Example.

Subsequently, the adhesive layer mix slurry was coated on both sides of a 12 μm-thick corona-treated porous polyethylene separator film and dried, preparing a separator having a 3 μm-thick adhesive layers 20a at both sides.

Preparation of Wound Element

The negative electrode, the separator, the positive electrode, and the separator were stacked in order and wound in a length direction by using a wick having a diameter of 3 cm. After fixing the end with a tape, the wick was removed, and the cylindrical electrode wound element was put in two sheets of 3 cm-thick metal plate and maintained for 3 seconds, preparing a flat electrode wound element.

Evaluation of Thickness Increase Ratio

The obtained electrode wound element was allowed to stand for 48 hours, and its thickness increase ratio before and after 48 hours was measured to evaluate shape stability. Herein, a smaller thickness increase ratio indicates satisfactory shape stability (i.e., a wound element is a little distorted). The thickness increase ratio was obtained by dividing the increased thickness of a device before and after allowed to stand for 48 hours by the thickness of the device before allowed to stand.

Preparation of Battery Cell

A battery cell was prepared by sealing the electrode wound element with an electrolyte solution under a reduced pressure with two lead wires out by using a laminate film consisting of three polypropylene/aluminum/nylon layers. The electrolyte solution was prepared by preparing ethylene carbonate/ethyl methyl carbonate in a volume ratio of 3:7 and dissolving 1 M $LiPF_6$ in the mixed solvent. The battery cell was inserted between two sheets of 3 cm-thick metal plate heated at 90° C. for 5 minutes.

The obtained battery cell was constant current charged up to 4.4 V with $\frac{1}{10}$CA of design capacity (1CA is a one hour discharge rate) and constant voltage charged at 4.4 V up to $\frac{1}{20}$ CA. Then, the cell was constant current discharged with $\frac{1}{2}$CA down to 3.0 V. In addition, the capacity of the cell at that moment was regarded as initial discharge capacity.

Cycle-Life Test

A cycle test was performed by repetitively constant current charging the cell at 0.5 CA and 4.4 V and constant voltage charging it up to 0.05 CA as a charge process and discharging it at 0.5 CA and 3.0 V, and its discharge capacity decrease rate (a retention rate) after 100 cycles based on the initial discharge capacity was measured to evaluate cycle-life performance. As the discharge capacity decrease rate is smaller, cycle-life characteristics are more excellent. The retention rate was obtained by dividing the discharge capacity after 100 cycles by the initial discharge capacity.

Cycle Expansion

The thickness of the prepared battery cell after measuring its initial discharge capacity was measured as an initial thickness, and the cell was 100 times repetitively ½ CA low current charged, ¹⁄₂₀ CA low voltage charged, and ½ CA constant current discharged in order at 4.4 V and 25° C. Then, the thickness of the battery cell was measured and used with the initial thickness to calculate a variation ratio. As an expansion ratio is smaller, the battery cell may have more excellent dimensional stability. In addition, as the expansion ratio is smaller, an adhesive layer may have larger adherence.

Adherence Evaluation by Bending Test

After measuring initial discharge capacity of the battery cell, its bending strength (bending resistance was measured by using a table-top universal testing machine, AGS-X made by Shimadzu Co.

The bending strength was measured by mounting the battery cell on a jig having a gap of 15 mm and disposing an indenter having a curvature with a gap diameter of 2 mmφ and a width of 30 mm parallel to the wound element. Then, a load applied to the cell was measured, while the indenter was pushed down at 1 mm/min, and the maximum value of the load was regarded as a bending point, obtaining bending strength. The bending strength experiment was performed according to the same method as done for a cell prepared in the same method as Example 1 except for using an uncoated polyethylene porous film having no adhesive layer as a separator as a standard battery cell. The maximum load of this standard battery cell was measured.

Subsequently, the same experiment was performed regarding the battery cell of Example 1 to measure its maximum load. When the obtained maximum load is less than 150% of the standard maximum load, the cell is classified as x, while the obtained maximum load is greater than or equal to 150% to less than 250%, the cell is classified as Δ, and when greater than or equal to 250%, the cell is classified as ø.

Example 2

The adhesive layer mix slurry was prepared by dissolving and dispersing the fluorine resin-containing particulate aqueous dispersed material of Example 1, poly-N-vinyl acetamide, a cross-linked poly methylmethacrylate particle (PMMA), and a boehmite particle in and into water as a solvent. Herein, the poly-N-vinyl acetamide is a binder for an adhesive layer. In addition, the cross-linked poly methylmethacrylate particle and the boehmite particle are a heat resistance filler. The cross-linked poly methylmethacrylate particle and the boehmite particle are mixed in a volume ratio of 50:50. In addition, the fluorine resin-containing particulate, the binder for an adhesive layer, and the heat resistance filler were mixed in a volume ratio of 45:4:51. Then, a battery cell was prepared according to the same method as Example 1 except for using the adhesive layer mix slurry.

Example 3

The fluorine resin-containing particulate aqueous dispersed material according to Example 1, polyvinylpyrrolidone, carboxylic acid-modified polybutyl acrylate, a cross-linked poly methylmethacrylate particle, and an alumina particle were dissolved and dispersed in and into water as a solvent, preparing adhesive layer mix slurry. Herein, the polyvinylpyrrolidone and the carboxylic acid-modified butyl acrylate were mixed in a ratio of 1:5 as a binder for an adhesive layer. In addition, the cross-linked poly methylmethacrylate particle and the alumina particle were mixed in a volume ratio of 30:70 as a heat resistance filler. Furthermore, the fluorine resin-containing particulate, the binder for an adhesive layer, and the heat resistance filler were mixed in a volume ratio of 44:6:50. A battery cell was prepared according to the same method as Example 1 except for using the adhesive layer mix slurry.

Example 4

The fluorine resin-containing particulate aqueous dispersed material of Example 1, polyvinyl alcohol and a cross-linked polystyrene particle were dissolved and dispersed in and into water as a solvent, preparing adhesive layer mix slurry. Herein, the polyvinyl alcohol was a binder for an adhesive layer, and the cross-linked polystyrene particle was a heat resistance filler. The fluorine resin-containing particulate, the binder for an adhesive layer, and the heat resistance filler were mixed in a volume ratio of 45:4:51. A battery cell was prepared according to the same method as Example 1 except for using the adhesive layer mix slurry.

Example 5

The fluorine resin-containing particulate aqueous dispersed material of Example 1, poly-N-vinyl acetamide, and carboxylic acid-modified butyl acrylate was dissolved and dispersed in and into water as a solvent, preparing adhesive layer mix slurry. Herein, the poly-N-vinyl acetamide and the carboxylic acid-modified butyl acrylate were mixed in a ratio of 1:5 as a binder for an adhesive layer. In addition, the fluorine resin-containing particulate and the binder for an adhesive layer were mixed in a volume ratio of 93:7. A battery cell was prepared according to the same method as Example 1 except for using the adhesive layer mix slurry.

Example 6

The fluorine resin-containing particulate aqueous dispersed material of Example 1, poly-N-vinyl acetamide, non-modified poly methylmethacrylate, a cross-linked polystyrene particle, and a boehmite particle were dissolved and dispersed in and into water, preparing adhesive layer mix slurry. Herein, the poly-N-vinyl acetamide and the non-modified SBR were mixed in a ratio of 1:4 as a binder for an adhesive layer. In addition, the cross-linked polystyrene particle and the boehmite particle were mixed in a volume ratio of 25:75 as a heat resistance filler. Furthermore, the fluorine resin-containing particulate, the binder for an adhesive layer, and the heat resistance filler were mixed in a volume ratio of 44:6:50. A battery cell was prepared according to the same method as Example 1 except for using the adhesive layer mix slurry.

Example 7

The fluorine resin-containing particulate aqueous dispersed material of Example 1, polyvinyl alcohol, a polyethylene ionomer aqueous dispersed material, and an alumina particle were dissolved in and dispersed in water as a solvent, preparing adhesive layer mix slurry. Herein, the polyvinyl alcohol and the polyethylene ionomer were mixed in a ratio of 1:5 as a binder for an adhesive layer. In addition, the alumina particle was a heat resistance filler. Furthermore, the fluorine resin-containing particulate, the binder for an adhesive layer, and the heat resistance filler were mixed in a volume ratio of 44:6:50. A battery cell was prepared according to the same method as Example 1 except for using the adhesive layer mix slurry.

Example 8

The fluorine resin-containing particulate aqueous dispersed material of Example 1, polyvinyl alcohol, a sodium salt of carboxylmethyl cellulose (CMC-Na), a carboxylic acid-modified polybutyl acrylate aqueous dispersed material, a cross-linked polymethyl methacrylate particle, and a boehmite particle were dissolved in and dispersed in water as a solvent, preparing adhesive layer mix slurry.

The polyvinyl alcohol, the sodium salt of carboxylmethyl cellulose, and the carboxylic acid-modified polybutyl acrylate were binders for an adhesive layer. The polyvinylpyrrolidone, the sodium salt of carboxylmethyl cellulose, and the carboxylic acid-modified polybutyl acrylate were mixed in a weight ratio of 45:10:5.

In addition, the cross-linked polymethyl methacrylate particle and the boehmite particle were mixed in a volume ratio of 50:50 as a heat resistance filler. Furthermore, the fluorine resin-containing particulate, the binder for an adhesive layer, and the heat resistance filler were mixed in a volume ratio of 44:6:50. Herein, the ionic water-soluble binder was used in an amount of 0.7 wt % based on the amount of the fluorine resin-containing particulate.

The adhesive layer mix slurry was used to prepare a battery cell according to the same method as Example 1.

Comparative Example 1

A separator was prepared by dissolving polyvinylidene fluoride in N-methyl pyrrolidone, coating the solution on both sides of 12 μm-thick porous polyethylene film, dipping the coated film in water, and drying it to form a mesh-type porous adhesive layer on both sides of the film. Herein, the adhesive layer was 3 μm thick. This separator was used according to the same method as Example 1, preparing a battery cell.

Comparative Example 2

The fluorine resin-containing particulate aqueous dispersed material of Example 1, carboxylic acid-modified polybutyl acrylate, sodium poly acrylate, and an alumina particle were dissolved in and dispersed in water as a solvent, preparing adhesive layer mix slurry. Herein, the carboxylic acid-modified butyl acrylate and the poly acrylic acid were mixed in a mass ratio of 1:5 as a binder for an adhesive layer. The alumina particle was a heat resistance filler. The fluorine resin-containing particulate, the binder for an adhesive layer, and the heat resistance filler were mixed in a volume ratio of 44:6:50. The ionic water-soluble binder of poly acrylic acid sodium was included in an amount of 2.3 wt % based on the amount of the fluorine resin-containing particulate. The adhesive layer mix slurry was used to prepare a battery cell according to the same method as Example 1.

Comparative Example 3

The fluorine resin-containing particulate aqueous dispersed material of Example 1, a sodium salt of an isobutylene maleic acid copolymer, and an alumina particle were dissolved in and dispersed in water as a solvent, preparing adhesive layer mix slurry. The sodium salt of an isobutylene maleic acid copolymer was a binder for an adhesive layer. In addition, the alumina particle was a heat resistance filler. The fluorine resin-containing particulate, the binder for an adhesive layer, and the heat resistance filler were mixed in a volume ratio of 45:4:51. The ionic water-soluble binder, the sodium salt of an isobutylene maleic acid copolymer, was used in an amount of 8.9 wt % based on the amount of the fluorine resin-containing particulate.

The adhesive layer mix slurry was used to prepare a battery cell according to the same method as Example 1.

Comparative Example 4

The fluorine resin-containing particulate aqueous dispersed material of Example 1, polyvinyl alcohol, a sodium salt of carboxylmethyl cellulose, and an alumina particle was dissolved in and dispersed in water as a solvent, preparing adhesive layer mix slurry. The polyvinyl alcohol and the sodium salt of carboxylmethyl cellulose were a binder for an adhesive layer. The polyvinyl alcohol and the sodium salt of carboxylmethyl cellulose were mixed in a mass ratio of 1:1. In addition, the alumina particle was a heat resistance filler. The fluorine resin-containing particulate, the binder for an adhesive layer, and the heat resistance filler were mixed in a volume ratio of 45:4:51. The carboxylmethyl cellulose sodium salt as an ionic water-soluble binder was used in an amount of 4.4 wt % based on the amount of the fluorine resin-containing particulate.

The adhesive layer mix slurry was used to prepare a battery cell according to the same method as Example 1.

Evaluation

The structures of the separators according to Examples 1 to 5 and Comparative Examples 1 to 4 were provided in Table 1, and their evaluation results are provided in Table 2.

TABLE 1

| | Presence of fluorine resin-containing particulate in separator | Binder 1 (non-ionic water-soluble) | Binder 2 (ionic water-soluble) | Binder 3 (ionic non-water-soluble) | Binder 4 (non-ionic non-water-soluble) | Filler 1 (Organic) | Filler 2 (Inorganic) |
|---|---|---|---|---|---|---|---|
| Example 1 | Yes | PNVA | — | carboxylic acid-modified polybutyl acrylate | — | cross-linked PS | alumina |
| Example 2 | Yes | PNVA | — | — | — | cross-linked PMMA | boehmite |

TABLE 1-continued

| | Presence of fluorine resin-containing particulate in separator | Binder 1 (non-ionic water-soluble) | Binder 2 (ionic water-soluble) | Binder 3 (ionic non-water-soluble) | Binder 4 (non-ionic non-water-soluble) | Filler 1 (Organic) | Filler 2 (Inorganic) |
|---|---|---|---|---|---|---|---|
| Example 3 | Yes | PVP | — | carboxylic acid-modified polybutyl acrylate | — | cross-linked PMMA | alumina |
| Example 4 | Yes | PVA | — | — | — | cross-linked PS | — |
| Example 5 | Yes | PNVA | — | carboxylic acid-modified polybutyl acrylate | — | — | — |
| Example 6 | Yes | PNVA | — | — | Unmodified PMMA | cross-linked PS | boehmite |
| Example 7 | Yes | PVA | — | polyethylene ionomer | — | — | alumina |
| Example 8 | Yes | PVP | CMC—Na (1.5 wt %) | carboxylic acid-modified polybutyl acrylate | — | cross-linked PMMA | boehmite |
| Comparative Example 1 | No | — | — | — | — | — | — |
| Comparative Example 2 | Yes | — | sodium polyacrylate (5.0 wt %) | carboxylic acid-modified butyl acrylate | — | — | alumina |
| Comparative Example 3 | Yes | — | Sodium salt of isobutylene maleic acid copolymer | — | — | — | alumina |
| Comparative Example 4 | Yes | PVA | CMC—Na | — | — | — | alumina |

TABLE 2

| | Thickness increase ratio (%) | Cycle-life (%) | Adherence | Cycle expansion (%) |
|---|---|---|---|---|
| Example 1 | 5 | 92 | ○ | 5 |
| Example 2 | 5 | 93 | ○ | 6 |
| Example 3 | 6 | 92 | ○ | 5 |
| Example 4 | 7 | 91 | ○ | 7 |
| Example 5 | 7 | 91 | ○ | 5 |
| Example 6 | 5 | 93 | Δ | 8 |
| Example 7 | 5 | 93 | ○ | 5 |
| Example 8 | 6 | 92 | ○ | 6 |
| Comparative Example 1 | 10 | 85 | ○ | 7 |
| Comparative Example 2 | 6 | 91 | X | 11 |
| Comparative Example 3 | 6 | 91 | X | 12 |
| Comparative Example 4 | 6 | 90 | X | 12 |

As shown in Table 2, the battery cells according to Examples 1 to 8 all had a small thickness increase ratio and a satisfactory cycle-life. In addition, the battery cells according to Examples 1 to 8 showed satisfactory adherence and small cycle expansion. On the other hand, the battery cell according to Comparative Example 1 was more deformed than the battery cells according to Examples 1 to 5, since a fluorine resin-containing polymer had a mesh structure rather than a particle phase and thus deteriorated shape stability of a flat-type wound element.

In addition, the battery cell of Comparative Example 1 showed deteriorated cycle-life, and the reason is that the flat-type wound element was deformed. In other words, since the belt-shaped separator of Comparative Example 1 was less slippery than the belt-shaped separators according to Examples 1 to 8, and not well slipped at the contact sides of the electrode stack structure when a wound element was formed to be flat, the electrode wound element was deformed. The battery cells according to Comparative Examples 2 to 4 showed deteriorated adherence and increased cycle expansion. In Comparative Examples 2, 3, and 4, the ionic water-soluble binder was included in an amount of greater than 2.0 wt % based on the amount of fluorine resin-containing particulate and thus showed deteriorated adherence and increased cycle expansion.

As a result, the wound elements according to Examples 1 to 8 were prepared by using a separator easily handled in a preparing process and also, suppressed from deformation and improved cycle-life of a non-aqueous electrolyte rechargeable battery. In addition, the adherence of the wound elements was improved, and cycle expansion was improved.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. An electrode wound element for a non-aqueous electrolyte rechargeable battery, comprising
a belt-shaped positive electrode;
a belt-shaped negative electrode;
a belt-shaped porous layer between the belt-shaped positive electrode and the belt-shaped negative electrode; and
an adhesive layer formed on a surface of the belt-shaped porous layer,
wherein the adhesive layer comprises a fluorine resin-containing particulate and a binder for the adhesive layer supporting the fluorine resin-containing particulate and having a total volume which is less than that of the fluorine resin-containing particulate, the binder for the adhesive layer comprising a combination of at least one water-soluble binder and at least one non-water-soluble binder,
wherein the non-water-soluble binder comprises at least one member selected from the group consisting of a carboxylic acid-modified acrylic acid ester and a carboxylic acid-modified styrene-butadiene copolymer; and
when the binder for the adhesive layer comprises an ionic water-soluble binder, a content of the ionic water-soluble binder is about 2 wt % or less based on a weight of the fluorine resin-containing particulate.

2. The electrode wound element of claim 1, wherein the binder for the adhesive layer comprises at least one member selected from the group consisting of an ionic non-water-soluble binder and a non-ionic water-soluble binder.

3. The electrode wound element of claim 2, wherein the non-ionic water-soluble binder comprises at least one member selected from the group consisting of poly-N-vinyl acetamide, polyvinyl alcohol, hydroxyethyl cellulose, methyl cellulose, polyvinylpyrrolidone, and polyoxyethylene.

4. The electrode wound element of claim 1, wherein the belt-shaped negative electrode comprises a negative active material layer comprising a negative active material and a fluorine resin-containing particulate, and wherein the adhesive layer is attached to the negative active material layer.

5. The electrode wound element of claim 1, wherein the fluorine resin-containing particulate is a spherical-shaped particle.

6. The electrode wound element of claim 1, wherein the fluorine resin comprises polyvinylidene fluoride.

7. A non-aqueous electrolyte rechargeable battery comprising the electrode wound element of claim 1.

8. A method of preparing an electrode wound element for a non-aqueous electrolyte rechargeable battery comprising:
coating an aqueous slurry on a surface of a belt-shaped porous layer, the aqueous slurry comprising a fluorine resin-containing particulate and a binder for an adhesive layer supporting the fluorine resin-containing particulate and having a total volume which is less than that of the fluorine resin-containing particulate, wherein the binder for the adhesive layer comprises at least one member selected from the group consisting of an ionic non-water-soluble binder, a non-ionic water-soluble binder, a non-ionic non-water-soluble binder and an ionic water-soluble binder or the binder for an adhesive layer includes an ionic water-soluble binder and at least one member selected from the group consisting of an ionic non-water-soluble binder, a non-ionic water-soluble binder and a non-ionic non-water-soluble binder, wherein a content of the ionic water-soluble binder is about 2 wt % or less based on the weight of the fluorine resin-containing particulate; and
drying the belt-shaped porous layer coated with the aqueous slurry, whereby the electrode wound element of claim 1 is obtained.

* * * * *